United States Patent
Parker

(10) Patent No.: US 6,934,369 B2
(45) Date of Patent: Aug. 23, 2005

(54) WHITE AND YELLOW PAGE MULTIMEDIA SERVICE

(75) Inventor: Jerry Joe Parker, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 142 days.

(21) Appl. No.: 10/403,770

(22) Filed: Mar. 31, 2003

(65) Prior Publication Data

US 2004/0190695 A1 Sep. 30, 2004

(51) Int. Cl.[7] .............................................. H04M 11/00
(52) U.S. Cl. ............................... 379/93.23; 379/142.06
(58) Field of Search ........................... 379/93.23, 93.25, 379/93.17, 90.01, 52, 142.01, 142.06, 142.07, 142.15, 142.17, 88.17, 88.19

(56) References Cited

U.S. PATENT DOCUMENTS

| | | | | |
|---|---|---|---|---|
| 5,546,447 A | * | 8/1996 | Skarbo et al. | 379/142.05 |
| 5,761,279 A | * | 6/1998 | Bierman et al. | 379/93.23 |
| 6,192,115 B1 | * | 2/2001 | Toy et al. | 379/130 |
| 6,389,124 B1 | * | 5/2002 | Schnarel et al. | 379/142.01 |
| 6,603,840 B2 | * | 8/2003 | Fellingham et al. | 379/93.23 |
| 6,760,413 B2 | * | 7/2004 | Cannon et al. | 379/88.19 |
| 2002/0159574 A1 | * | 10/2002 | Stogel | 379/93.01 |

\* cited by examiner

*Primary Examiner*—Wing Chan
(74) *Attorney, Agent, or Firm*—Slater & Matsil, L.L.P.

(57) ABSTRACT

A system for providing integrated multimedia and voice telephone service by simply dialing a telephone number is provided. One or both parties of a typical voice telephone call placed by the calling party dialing the called party number may simultaneously receive multimedia packets of data associated with the other party if both of the voice telephone devices are connected to or associated with a multimedia display device, and both telephone numbers are associated with clients or subscribers of the multimedia service. Multimedia data that may be provided to one or both parties includes names, office hours, maps of the other party's location, etc.

25 Claims, 2 Drawing Sheets

WHITE AND YELLOW PAGE MULTIMEDIA SERVICE

TECHNICAL FIELD

The present invention relates generally to integrated use of voice telephone devices (cellular and POTS (plain old telephone services)) and multimedia devices such as PC's, PDA's and multimedia cell phones that can receive various types of data packets in addition to voice packets. More specifically, according to this invention a public or private enterprise network service associates a user's (calling party or called party) circuit device (i.e., wired or wireless voice telephone devices) for normal voice communications with the user's packet data devices (such as PC, PDA and multimedia cell phones) to simultaneously provide multimedia data about the other party (called party or calling party) making up the telephone link. Still more particularly, the invention relates to a system for accessing a database where units of data are associated with one or more specific telephone numbers used for voice communications by a participating party doing nothing more than dialing a telephone number. One example of such a database would be the data that would be available by a reverse lookup digital database equivalent to a telephone white pages and yellow pages service. The data which may be displayed by a multimedia device could represent data associated with a "called party" that is presented or made available to a "calling party," or data associated with the "calling party" presented or made available to the "called party." If both parties have an appropriate multimedia display device interconnected or associated with the voice telephone device, information relating to each of the parties of the communication link may be sent to the other party of the communication link.

BACKGROUND

A somewhat related prior art system includes the well known 911 system, which is triggered by the incoming caller ID or telephone number. In addition, there are other private database systems which use the caller ID incoming information to provide information about the calling party to the called party. As an example, according to some prior art systems, an incoming customer caller ID information may be used to provide a customer profile or bring up personal data concerning the customer. Alternately, specific information concerning the customer's order such as shipped date, estimated shipping date, tracking numbers, etc. may be made available before the customer makes an inquiry. However, these are not typically systems that a client can subscribe to, and use of the data provided by present systems are typically restricted to the called party. That is, information about the calling party is provided to the called party, but information associated with the called party is not typically provided to the calling party.

SUMMARY OF THE INVENTION

Embodiments of the present invention display information associated with at least one of the called and calling numbers of a voice telephone link to a system client or subscriber by simply dialing a number.

In accordance with one embodiment of the present invention, the method comprises the steps of storing a multiplicity of units of specific information at a central location wherein each unit of specific information is associated with at least one specific telephone number. First and second bidirectional voice telephone devices associated respectively with first and second telephone numbers are provided, and a first display device is associated with the first telephone device. The telephone number associated with one of the first and second telephone devices is dialed from the other one of the first and second telephone devices in a normal manner to make a voice telephone link. A unit of specific information associated with the second telephone number is then transmitted to the first display device associated with said first telephone device. If both the dialed and dialing telephone numbers belong to a client or subscriber, appropriate information is provided to both parties of the telephone link. That is, the calling party receives data associated with the called party, and the called party receives data associated with the calling party.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
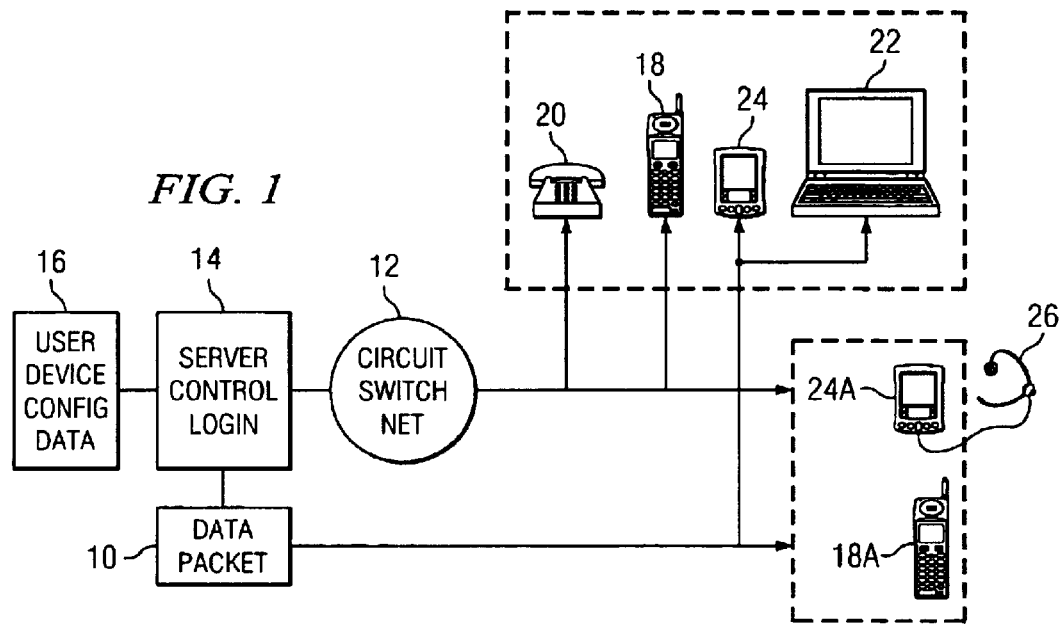
FIG. 1 illustrates various combinations of voice telephone devices and multimedia devices that can be used with the present invention.

Referring now to FIG. 1, there is illustrated various combinations of voice telephone and multimedia devices that can be used by a party (called party or calling party) of a telephone communication link according to the teachings of the present invention. As shown, there is included a data packet network 10 such as commonly used by the internet and a circuit switch network 12 such as may be used by a basic telephone system also including a cellular telephone system. According to the present invention, there will be service control logic indicated by block 14 which depends upon the user device configuration data shown in block 16.

The user device configuration data available at block 16 allows the service control logic 14 to evaluate the ID of the calling party and the called party. Typically these ID's will simply be the calling telephone number and the called telephone number. As is shown, the voice telephone devices may comprise either a cellular phone 18 or a standard desktop or home telephone 20. A packet data network display device typically will include a computer terminal, such as a laptop terminal 22 or a desk PC or a PDA (personal digital assistant) device 24.

It will also be appreciated that a PDA device 24*a* with a microphone and headset 26 may be configured as an integrated device that will provide both the voice telephone communications and the multimedia communications. Likewise, many recently available cellular telephones include a large display area such as device 18*a* and, although they cannot offer the full range of functions as a PDA at this time, they are also suitable for receiving simplified packet data information. Thus, also as shown, the various user devices may be classified as separate devices such as telephones 18 and 20 connected to the circuit switch network 12 and the PDA 24*a* and laptop computer 22 connected to the data packet network 10. Combination or integrated devices include the PDA device 24*a* with a headset and microphone 26 and telephone 18*a* having a large display area.

Figure 2:
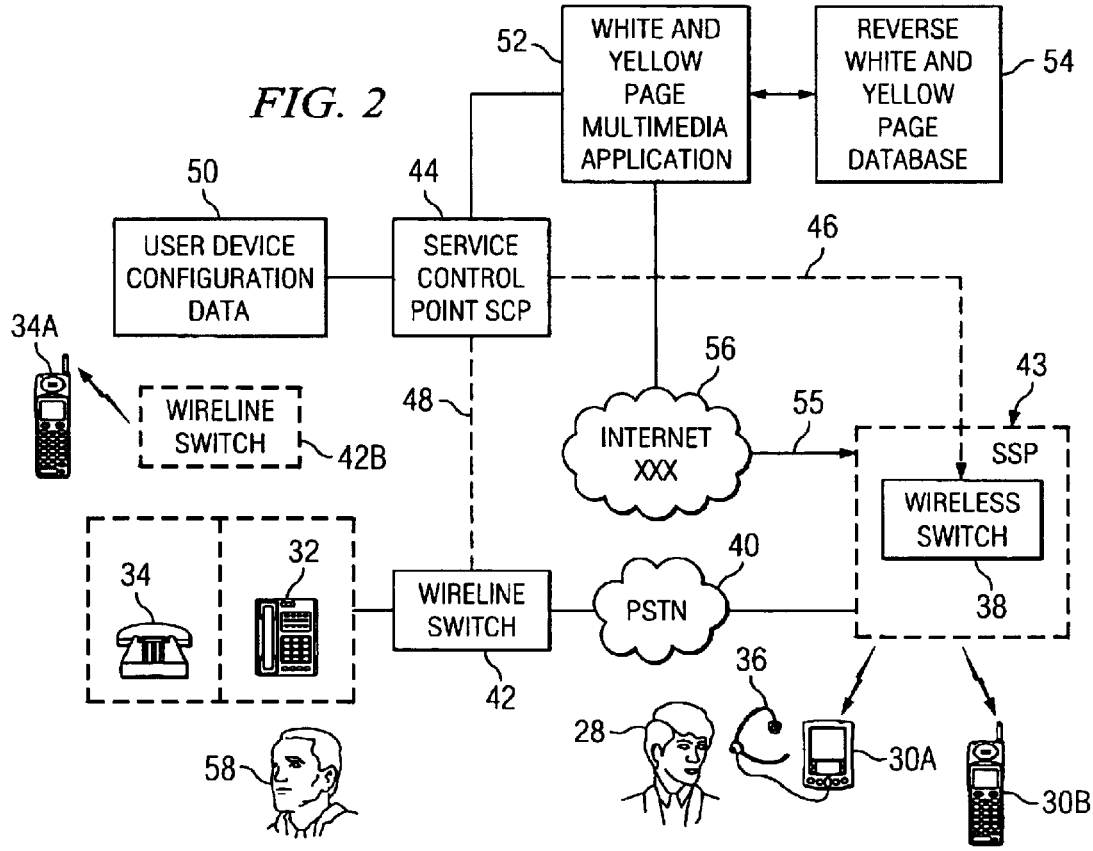
FIG. 2 illustrates a block diagram of the system of the present invention wherein one party has a multimedia device associated with the voice telephone device and the other party only has voice telephone service.

Referring now to FIG. 2, there is illustrated a block diagram arrangement of the present invention wherein a calling party 28 has a multimedia device such as a PDA 30*a* or cellular phone 30*b* with a multimedia display, and the called party only has standard voice telephone service such as is available for a business 32 or residence 34. As shown, the calling party 28 will place a call to another party by simply dialing the standard telephone number. In the embodiment shown, the device used by the calling party 28 is a PDA device 30*a* as was discussed above with a headset and microphone connection 36 and the number is typically called by a point and click. Alternately, the device could be at a desk with a PC or a laptop computer as was discussed above wherein either number keys or a point and click technique may be used. Also, as was discussed above, the calling party 28 may dial the phone from a multimedia cell phone which has a large display area 30 with standard touchtone display keys. The dialed number along with the number of the calling device will then be provided to a standard wireless switch circuit 38, as shown, or a wireline switch circuit depending upon whether the system is a mobile system or a normal wired system. The normal voice telephone system is then connected to the PSTN (public switched telephone network) system as represented by cloud 40 which also provides normal voice telephone services to the called party telephone 32 (or residence telephone 34). The called telephones 32, 34 is of course also connected to the PSTN 40 through either a wireline switch 42, as shown, or a wireless switch, whichever is appropriate. Thus, at this point, it is seen that the telephone communication link has proceeded according to a normal voice telephone call.

Referring again to the wireless switch 38, which may for example be included as part of an SSP (service switching point) 43 it is seen that now, instead of going only to the PSTN cloud or network 40, the wireless switch 38 will also provide a signal to the service control point logic 44 by path 46 which, as discussed, could be a wired connection or a wireless connection depending on the type of voice telephone device is being used by user 30. Likewise, the wireline switch 42 is also connected to the service control point 44 by a connection 48 which could also be either a wireless or wired connection, whichever is appropriate for the telephones 32, 34. The information provided from the switch 38 to the service control point logic 44 will at least include identification data of the calling party and the called party. Typically of course, the ID of the two parties will be the appropriate telephone numbers.

Also connected to service control point logic 44 is a user device configuration data logic circuit 50 which will evaluate or monitor the calling party and the called party telephone numbers transmitted from switch 38 to service control point logic 44 to determine if either or both of the parties are multimedia clients or subscribers participating in the service, and whether or not the called and/or calling device can handle multimedia data. Since, in the present example only, the calling party 28 is a multimedia client or subscriber, the service control point logic 44 will alert the multimedia system, such as for example a white and yellow page multimedia application system 52, that the calling number is associated with a multimedia display device and is a client or subscriber number. The white and yellow page multimedia application will then consult the reverse white and yellow page database 54 to retrieve appropriate information associated with the called number. The reverse white and yellow page database 54, as illustrated, is simply a database wherein data associated with a specific telephone number is identified or accessed and made available to a client according to the telephone number associated with the called party. Thus, the information contained in the database may include addresses, office hours, location maps, internet addresses, or substantially any other information that a business or residential subscriber might want provided and made available to the public. Since, according to the present example, the multimedia client was the calling party 28 or calling number, the data that will be provided or returned back to the multimedia device 30*a* (or 30*b*) will be any information available that is associated with the called party. Once this information is provided back to the multimedia application 52, the data is then provided through a different transmission channel, such as channel 55, to the multimedia device 30*a* (or 30*b*). That is, the multimedia information could be provided from the multimedia application 52 from multiple methods of delivering wireless content to a multimedia user. For example, a multimedia application could operate through the internet as indicated by internet cloud 56 using an SIP (session initiated protocol system), an SMS (short message service), an MMS (multimedia message service), a WAP (wireless application protocol), or an IM (instant message) system.

An example of the service provided by the system discussed with respect to FIG. 2 could proceed as follows: The calling party 28 dials the number of his dentist who is connected to business telephone 32 to find out office hours. As soon as the dialed call is placed, the originating SSP 43, which supports wireless switch 38 notifies the SCP 44 of the call origination including the called party's telephone number and, as will be discussed further, the calling party's telephone number. As was discussed earlier, the normal aspects of a voice telephone call proceed as normal, but at the same time, the information transmitted to the SSP 43 is checked by the SCP 44 to determine if the calling (or called) party is a multimedia client. If the calling party is a multimedia client with a multimedia device connected, the SCP 44 will alert the white and yellow page multimedia application 52 of the originating call. The multimedia application 52 will then use the reverse white and yellow page database 54 to find data associated with the called party, or in this case, the caller's dentist. Such data could for example include the office hours of the dentist and a location map to show a patient the office location. Thus, if the caller was only interested in the dentist's office hours, it may not even be necessary for the called party, namely the dentist's office, to take the call as the information may be available to the calling party 28 before the phone can even be answered.

To accomplish this, the white and yellow page multimedia application 52 will format a multimedia message including relevant details as discussed above such as addresses, hours, locations, URL's, advertising, or so forth, of the called party and then use the appropriate communication protocol (for example SIP session, multimedia messaging, instant messaging, short messaging, etc. as discussed above), in the normal manner to send the formatted information to the calling party or user 28.

Referring again to FIG. 2, there is also illustrated another embodiment of the present invention wherein the called party 28 has the multimedia device associated with a telephone device and the calling party 58 only has a standard voice telephone service. Thus, as shown, a calling party 58 at a business telephone 32 or residence telephone 34 will use the device or telephone to place a standard telephone call which proceeds through the wireline switch 42, through the PSTN (public switch telephone network) 40 through the SSP 43 containing the wireless switching network 38 to the called party or user 28 with the multimedia device 30*a* with the headset and microphone 36. Alternately, the called party 28 could be using the multimedia cell phone 30*b*, and, as discussed above, the telephone device used by the calling party could be a cellular telephone 34*a* connected through a wireless switch 42*b*. In either situation, since the calling party at telephone 32 or 34 is not a client of the multimedia device application or service, service control point logic 44 will not be alerted or notified of the call until the connection reaches wireless switch 38 at the terminating SSP 43. The terminating SSP 43 will then notify the SCP 44 of the call including the calling party's telephone number. At this point the data flow information and the formatting of the multimedia message proceeds as occurred and discussed above, except the provided data will be with respect to the calling party and will be provided to the called party rather than information concerning the called party 28 being provided to the calling party as was discussed above. Thus, in this situation assuming the calling party was the dentist's office calling to remind user 28 of an appointment, information related to the dentist's office will be provided to the called party or user 28.

Figure 2A:
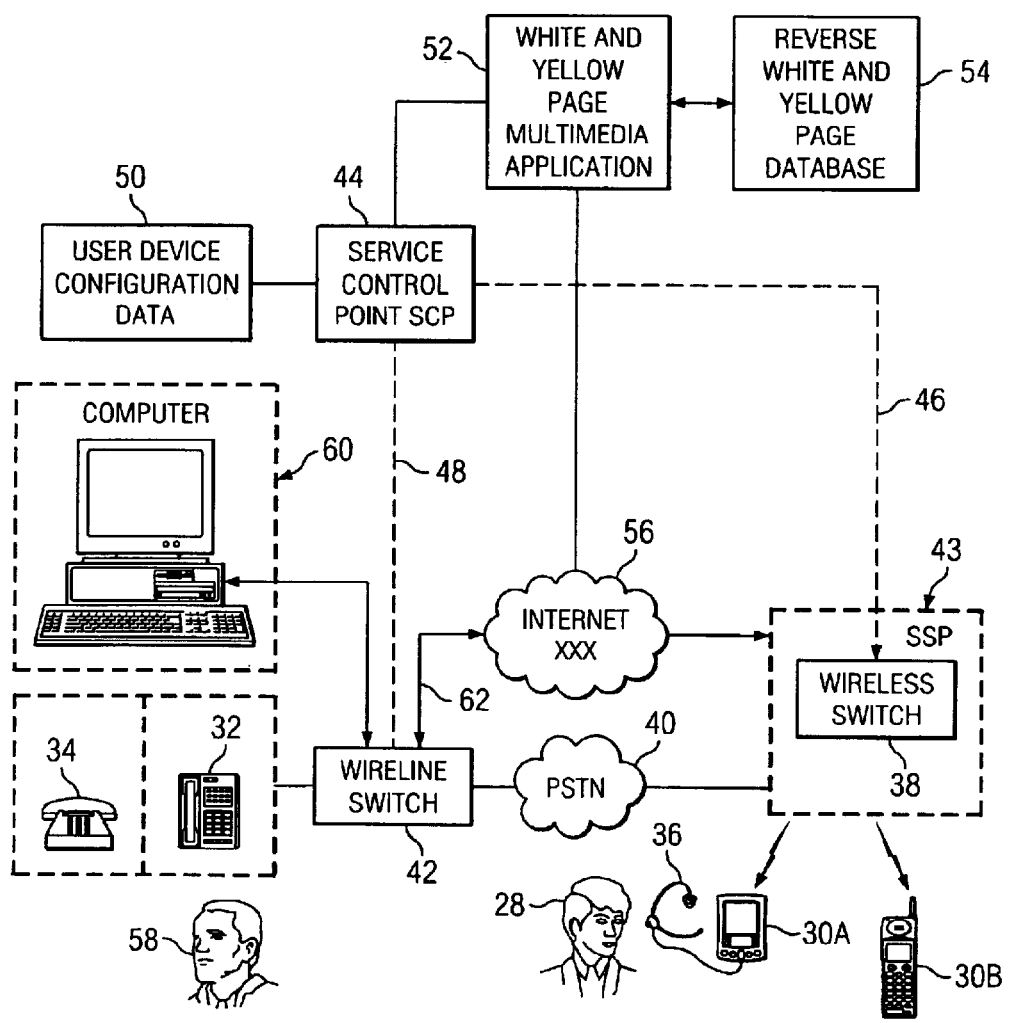
FIG. 2A is similar to FIG. 2 except both parties of the connection have multimedia devices.

It is possible of course that both the calling party 58 and the called party 28 will be clients of the multimedia application or service. Therefore, as shown in FIG. 2A, there is a logic diagram substantially the same as shown in FIG. 2 except that in addition to the called party 28 having a multimedia device, the calling party 58 also has a multimedia device, such as computer 60, and is also connected to the multimedia application 52 as indicated by line 62. Thus, the multimedia information of the called party 28 will be made available to the calling party 58 using multimedia device or computer 60 and the multimedia information of the calling party 58 will be made available to the called party 28 at either multimedia device 30*a* or 30*b*.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, circuitry, means, methods and steps described in the specification. As one of ordinary skill in the art will readily appreciate from the disclosure of the present invention, processes, circuitry, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for displaying multimedia data packet information associated with at least one of the called and calling telephone numbers to a system client or subscriber comprising the steps of:

storing a multiplicity of units of specific multimedia data packet information at a first central system location, each unit of specific information associated with at least one specific telephone number;

providing first and second bidirectional voice telephone devices associated respectively with first and second telephone numbers, and associating a first multimedia data packet display device with said first telephone device, each of said first and second bidirectional voice telephone devices at locations remote from said central system location;

dialing the telephone number associated with one of said first and second telephone devices from the other one of said first and second telephone devices;

evaluating said first and second telephone numbers with service control point SCP logic and determining that said first number is associated with a system client and a multimedia data packet display device;

transmitting a unit of specific multimedia data packet information stored in said central system location and associated with said second telephone number to said first display device associated with said first telephone device and in response to a signal from said SCP logic; and automatically initiating a connection between said first bidirectional voice telephone devices and said second bidirectional voice telephone devices with the PSTN (public switched telephone network).

2. The method of claim 1 wherein said step of dialing comprises the step of dialing the telephone number associated with said first telephone device from said second telephone device.

3. The method of claim 1 wherein said step of dialing comprises the step of dialing the telephone number associated with said second telephone device from said first telephone device.

4. The method of claim 3 wherein said step of providing, further comprises the step of associating a second display device with said second telephone device and comprising the further steps of determining that said second telephone number is also associated with a system client and a multimedia data packet display device, and transmitting a unit of specific multimedia data packet information associated with said first telephone number to said second display device associated with said second telephone device.

5. The method of claim 1 further comprising the step of displaying said multimedia data packet information associated with said second telephone number on said first display device.

6. The method of claim 4 further comprising the step of displaying said multimedia data packet information associated with said second telephone number on said first display device and displaying said multimedia data packet information associated with said first telephone number on said second display device.

7. The method of claim 1 wherein at least one unit of said multiplicity of units of specific multimedia data packet information is associated with a multiplicity of specific telephone numbers.

8. The method of claim 1 wherein said specific information stored in said storing step is the multimedia data packet information contained in a reverse white and yellow page database.

9. The method of claim 1 wherein at least one of said first and second telephone devices is a wireless device.

10. A method for displaying multimedia data packet information associated with at least the called telephone number of a telephone link to a system subscriber or client comprising the steps of:

storing a multiplicity of units of specific multimedia data packet information at a central system location, each unit of specific information associated with at least one specific telephone number;

providing a first bidirectional voice telephone device identified with a unique first telephone number, said first telephone device including a first multimedia data packet display device at a location remote from said central system location:

providing a second bidirectional voice telephone device identified with a unique second telephone number at another location remote from said central system location:

dialing the telephone number associated with said first device from said second device;

evaluating said first and second telephone numbers with service control point (SCP) logic and determining that said first number is associated with a system client and a multimedia data packet display device:

transmitting a unit of specific multimedia data packet information stored in said central system location and associated with said second telephone number to said first display device associated with said first telephone device;

displaying said transmitted multimedia data packet information associated with said second telephone number on said first display device; and automatically initiating a connection between said first bidirectional voice telephone device and said second bidirectional voice telephone device with the PSTN (public switched telephone network).

11. A method for displaying multimedia data packet information associated with at least the calling telephone number of a telephone associated with a system subscriber or client comprising the steps of:

storing a multiplicity of units of specific multimedia data packet information at a system location, each unit of specific multimedia data packet information associated with at least one specific telephone number;

providing a first bidirectional voice telephone device identified with a first telephone number located remote from said central system location, said first telephone device including a first multimedia data packet display device;

providing a second bidirectional voice telephone device identified with a second telephone number located remote from said central system location;

dialing the telephone number associated with said second device from said first device;

evaluating said first and second telephone numbers with service control point (SCP) logic and determining that said first number is associated with a system client and a multimedia data packet device:

transmitting a unit of specific multimedia data packet information stored in said central system location and associated with said second telephone number to said first display device associated with said first telephone device;

displaying said transmitted multimedia data packet information, associated with said second telephone number on said first display device; and automatically initiating a connection between said first bidirectional voice telephone device and said second bidirectional voice telephone device with the PSTN (public switched telephone network).

12. The method of claim 10 wherein said step of providing a second bidirectional voice telephone device comprises the step of providing a second bidirectional voice telephone device identified with said second telephone number and wherein said second telephone device also includes a multimedia data packet display device and further comprising the steps of:

transmitting a unit of specific multimedia data packet information associated with said first telephone number to said second multimedia data packet display device included with said second telephone device; and displaying said transmitted multimedia data packet information associated with said first telephone number on said second multimedia data packet display device.

13. The method of claim 10 wherein at least one unit of said multiplicity of units of specific multimedia data packet information is associated with a multiplicity of specific telephone numbers.

14. The method of claim 11 wherein at least one unit of said multiplicity of units of specific information is associated with a multiplicity of specific telephone numbers.

15. The method of claim 10 wherein said specific information stored in said storing step is the information contained in a reverse white and yellow page database.

16. The method of claim 11 wherein said specific information stored in said storing step is the information contained in a reverse white and yellow page database.

17. The method of claim 12 wherein said steps of providing first and second bidirectional voice telephone devices comprises the steps of providing multiple first bidirectional voice telephone devices, each identified with a unique first telephone number and each associated with a first multimedia data packet display device and providing multiple second bidirectional voice telephone devices, each identified with a unique second telephone number and each associated with a second multimedia data packet display device, wherein a portion of said multiple second devices dials the telephone numbers of a portion of said multiple of first devices and wherein specific units of multimedia data packet information associated with said specific first telephone number are provided to specific ones of said second display devices and specific units of multimedia data packet information associated with said specific second telephone numbers are provided to specific ones of said first display devices.

18. The method of claim 17 wherein said specific multimedia data packet information stored in said storing step is the information contained in a reverse white and yellow page database.

19. The method of claim 17 wherein at least one of said first and second telephone devices is a wireless device.

20. A telephone communication system connected to a public telephone network for displaying information associated with at least one of the called and calling telephone numbers of a telephone link comprising:

an information database for storing a multiplicity of units of specific multimedia data packet information wherein each unit of said specific multimedia data packet information is associated with at least one specific telephone number;

first and second bidirectional voice telephone devices, said first telephone device including a multimedia data packet display device and each of said first and second telephone devices adapted for dialing telephone numbers;

service control point (SCP) logic connected to said first and second telephone devices for determining the called and calling telephone numbers of a telephone links, for determining if said called and calling telephone numbers are associated with a unit of specific multimedia data packet information stored in said information database, and for determining that said first number is associated with a system client and a multimedia display device;

circuitry for transmitting multimedia data packet information associated with said second telephone number to said multimedia data packet display device; and public switched telephone network (PSTN) circuitry for automatically connecting said first bidirectional voice telephone device to said second bi-directional voice telephone device.

21. The system of claim 20 wherein said information database comprises a reverse look up white and yellow page database.

22. The system of claim 21 wherein said first bidirectional telephone devices are selected from a group consisting of a wired multimedia telephone, a wireless multimedia telephone, a PDA and a combination voice telephone connected to a PC.

23. The system of claim 22 wherein said second bidirectional telephone devices are selected from a group consisting of wired telephones and wireless telephones.

24. The system of claim 22 wherein said circuitry for transmitting multimedia data packet information is a system selected from the group consisting of an SIP, an SMS, an MMS, a WAP and an IM system.

25. The system of claim 20 wherein at least one of said first and second telephone devices is a wireless device.

* * * * *

UNITED STATES PATENT AND TRADEMARK OFFICE
CERTIFICATE OF CORRECTION

PATENT NO. : 6,934,369 B2  
DATED : August 23, 2005  
INVENTOR(S) : Parker

It is certified that error appears in the above-identified patent and that said Letters Patent is hereby corrected as shown below:

Column 7,  
Lines 28, 32 and 38, delete ":" and insert -- ; --.  
Line 57, insert -- central -- between "a" and "system".

Column 8,  
Line 6, delete ":" and insert -- ; --.  
Line 13, delete ",".

Column 9,  
Line 21, delete "links" and insert -- link --.

Signed and Sealed this

Sixth Day of December, 2005

JON W. DUDAS  
*Director of the United States Patent and Trademark Office*